Nov. 2, 1965 R. M. HILL 3,215,787
TUNNEL EFFECT TRANSDUCER AMPLIFIER
Filed June 15, 1961

INVENTOR.
ROBERT M. HILL
BY John F. Lawler
ATTORNEY

United States Patent Office 3,215,787
Patented Nov. 2, 1965

3,215,787
TUNNEL EFFECT TRANSDUCER AMPLIFIER
Robert M. Hill, Palo Alto, Calif., assignor to General Telephone and Electronics Laboratories Inc., a corporation of Delaware
Filed June 15, 1961, Ser. No. 117,424
3 Claims. (Cl. 179—110)

This invention relates to transducers, and more particularly to a solid state transducer amplifier based on electron tunneling effects.

The phenomenon of electrons tunneling through a potential barrier recently has come into prominence through the discovery by L. Esaki of the tunnel diode reported in Physical Review, volume 109, page 603 (January 1958). According to the theory of quantum mechanics, electrons can tunnel through an insulating barrier if the barrier is sufficiently narrow so that the electron wave function (electron as well as other fundamental particles can be treated as wave packets) on the other side of the barrier has a finite value. Such tunneling of electrons between two conductors separated by a thin semiconductor barrier has been described in the copending patent application of Donovan V. Geppert, Serial No. 58,841, filed September 27, 1960, entitled "Cold Cathode."

The instant invention is based on the discovery that the pressure across a thin dielectric layer mounted between two metals has a pronounced effect on the tunneling current. Variations in this applied pressure result in large changes in the tunneling current so that a measure of magnitude or modulation of the current provides a measure of the character of pressure applied across the insulating layer. This solid state transducer inherently amplifies the pressure effects so that accurate measurement of very small changes of these effects can be made.

An object of this invention is the provision of a force or pressure responsive solid state transducer amplifier.

Another object is the provision of a solid state transducer capable of producing large current changes proportional to small changes of force or pressure.

A further object is the provision of a transducer amplifier that is compact, economical to produce and operate, and simple to install and maintain.

The accomplishment of these and other objects of the invention will become apparent from the following description of a preferred embodiment thereof, reference being had to the accompanying drawings in which.

Figure 1:
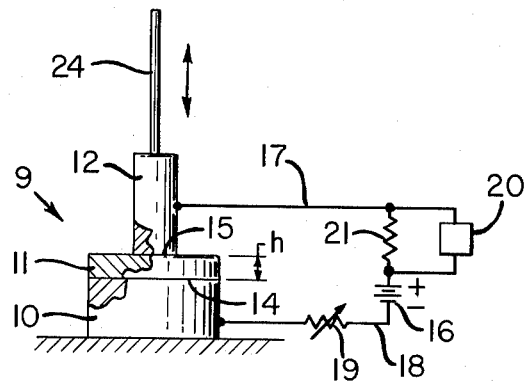
FIGURE 1 is a schematic diagram (not to scale) of a transducer amplifier embodying the invention, together with associated bias and detecting circuits.

Referring now to FIGURE 1, a transducer 9 embodying this invention comprises a base 10 of metal, a barrier or dielectric layer 11, and a terminal post 12 of metal. Layer 11 is sandwiched tightly between the base 10 and post 12 so that uniform intimate contact between these parts exists at the junctions or interfaces 14 and 15 on opposite sides of barrier 11.

Base 10 may comprise a sheet of titanium (Ti) and a semiconductor barrier layer 11 of titanium oxide (TiO) formed by oxidizing the base titanium in an oven. The height $h$ of barrier 11 must be extremely small, in the order of 100 Angstrom units, and the oxidation process therefore is accurately controlled to achieve this result. Post 12 may be any conductor, such as copper, and is held in close contact with surface 15 of barrier 11 by a transducer housing, not shown, or other suitable mechanical means.

A biasing voltage is applied across barrier 11 by a unidirectional voltage source 16 having a positive terminal connected to post 12 by lead 17 and a negative terminal connected to base 10 by lead 18. Adjustment of this bias is provided by variable resistor 19 in series with this source. A detector 20, such as an ammeter, is connected across series resistor 21 to measure the magnitude of current flowing in the circuit. Detector 20 may be any type of measuring or control circuit which is responsive to current flowing through transducer 9.

With a suitable bias voltage applied across barrier 11, electrons tunnel from base 10 through barrier 11 to post 12. This flow of current is extremely sensitive to pressure applied normal to interfaces 14 and 15, for example, a force applied by rod 24 to post 12, and any variation in this pressure causes a significant change in current flow. This transducer action is believed to occur because the change in pressure essentially changes the physical height $h$ of barrier 11, a parameter which has pronounced effect on the magnitude of tunneling current.

Figure 2:
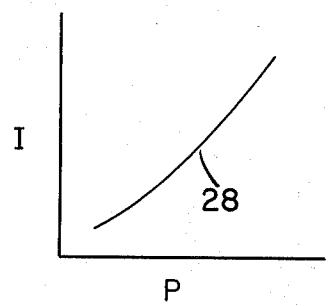
FIGURE 2 is a curve showing the relationship between current through the transducer and pressure across it.

The change in tunneling current $I$ with pressure $P$ applied to barrier 11 is shown by curve 28 in FIGURE 2. As the pressure increases, the height $h$ of the barrier decreases and tunneling current increases as shown. By way of example, a titanium-titanium oxide-copper transducer with a 10 volt bias produced a current of 0.009 milliampere at atmospheric pressure and 0.024 milliampere with a pressure of 100 grams per square centimeter. The device is capable of responding to voice pressure changes at audio frequencies on a diaphragm as in FIGURE 3 with approximately 10 percent modulation. An important feature is the inherent amplification factor due to the valve action of the tunneling junctions at interfaces 14 and 15.

Figure 3:
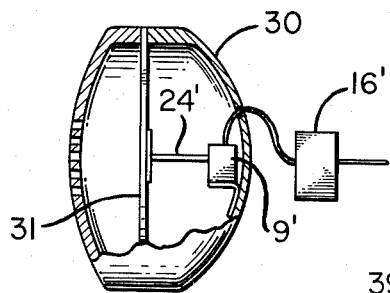
FIGURE 3 is a sectional view of a telephone microphone utilizing the invention.

The transducer has a number of useful applications. FIGURE 3 shows the transducer 9' mounted on the housing 30 of a telephone headset. Actuating rod 24' similar to rod 24 in FIGURE 1, abuts against flexible diaphragm 31 which responds to voice sound waves. The vibration of diaphragm 31 causes rod 24' to pressure modulate the transducer, producing an amplified modulated current output in the external circuit 32 for transmission.

Figure 4:
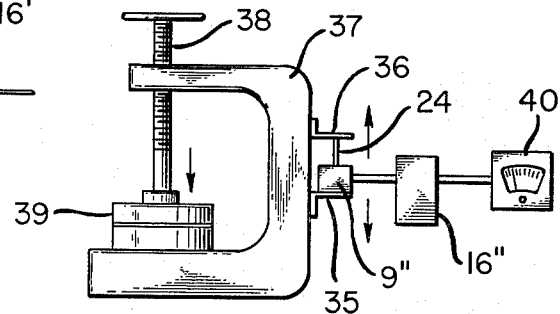
FIGURE 4 is a schematic diagram of a strain gauge embodying the invention and utilized in conjunction with measurement of a stress in a press frame.

Transducer 9 is useful as a strain gauge because of its amplified response to relatively small displacements. FIGURE 4 shows such an application in which the transducer 9" is mounted between flanges 35 and 36 on housing 37 of a C-press. As the screw 38 of the press is rotated to apply a force against object 39, the stress in housing 37 is measured as a force applied to transducer actuating rod 24". The change in magnitude of tunneling current through the transducer measured by detector 40 gives a reading directly in units of stress.

Figure 5:
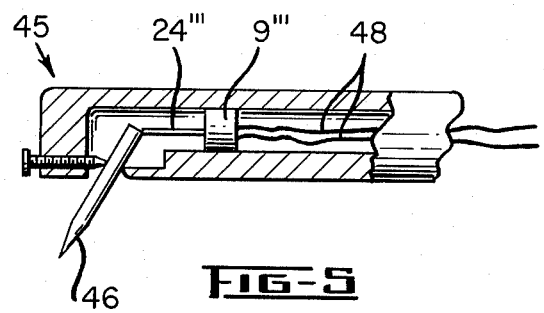
FIGURE 5 is an elevation, partly in section, of a phonograph pickup head with a transducer embodying the invention.

A feature of this transducer is its compactness and lightness which readily adapts it for applications having sever space limitations. A typical example is a phonograph pickup head 45, see FIGURE 5, with needle 46 pivotally mounted therein adapted to engage in and follow the sound track on a phonograph record. As the record turns, needle 46 vibrates and applies a varying force to rod 24''' of transducer 9''' mounted in the head. The modulated current output of the transducer is transmitted by leads 48 to the sound reproducing stages of the phonograph.

What is claimed is:

1. A transducer amplifier adapted to produce an electrical signal in response to a condition, comprising first and second spaced apart planar electrodes, and a thin layer of dielectric material interposed between and held in close contact with the adjacent surfaces of said electrodes to form a sandwich-like structure, a source of unidirectional voltage connected to said electrodes and applying a biasing voltage across said dielectric layer, whereby a tunneling current flows between said electrodes through said layer, an actuating rod connected to one of said electrodes adapted to apply a force normal to the dielectric layer in response to the condition, and means responsive to the magnitude of tunneling current for producing an effect proportional to said force.

2. An amplifier as set forth in claim 1 wherein said means includes a diaphragm responsive to sound waves, said rod being interposed between said diaphragm and one of said electrodes to apply the mechanical vibrations of said diaphragm to said structure.

3. A transducer amplifier according to claim 2 in which said dielectric layer comprises an oxide of one of said members and is in the order of 100 Angstrom units thick.

References Cited by the Examiner

UNITED STATES PATENTS 2,694,128 11/54 Maurin _____ 179—100.41
3,107,277 10/63 Rogers _____ 179—1

FOREIGN PATENTS 1,089,807 9/60 Germany.
354,120 6/61 Switzerland.

ROBERT H. ROSE, *Primary Examiner.*

ALBERT GAUSS, *Examiner.*